(12) United States Patent
Bishop et al.

(10) Patent No.: US 6,695,967 B2
(45) Date of Patent: Feb. 24, 2004

(54) REACTION BONDED ALUMINA FILTER AND MEMBRANE SUPPORT

(75) Inventors: Bruce A. Bishop, Arlington, MA (US); Peter J. Hayward, Pinawa (CA); Robert L. Goldsmith, Wayland, MA (US); Garry G. Haacke, Belmont, MA (US)

(73) Assignee: CeraMem Corporation, Waltham, MA (US)

( * ) Notice: Subject to any disclaimer, the term of this patent is extended or adjusted under 35 U.S.C. 154(b) by 30 days.

(21) Appl. No.: 10/097,921

(22) Filed: Mar. 13, 2002

(65) Prior Publication Data

US 2003/0175496 A1 Sep. 18, 2003

(51) Int. Cl.$^7$ .............................. B01D 35/06; B32B 3/12
(52) U.S. Cl. ..................... 210/510.1; 419/2; 419/19; 428/116; 428/188; 428/304.4
(58) Field of Search ................ 75/249, 235; 419/2, 419/19; 428/116, 188, 304.4; 210/510.1

(56) References Cited

U.S. PATENT DOCUMENTS

| | | | |
|---|---|---|---|
| 3,885,997 A | 5/1975 | Bucher et al. ............. 148/12.3 |
| 3,899,326 A | 8/1975 | Frost et al. ................... 75/214 |
| 4,060,488 A | 11/1977 | Hoover et al. .......... 210/433 M |
| 4,069,157 A | 1/1978 | Hoover et al. .......... 210/433 M |
| 4,276,071 A | 6/1981 | Outland ........................ 55/523 |
| 4,293,357 A | 10/1981 | Higuchi et al. ............... 156/89 |
| 4,329,162 A | 5/1982 | Pitcher et al. ................. 55/523 |
| 4,340,403 A | 7/1982 | Higuchi et al. ............... 55/523 |
| 4,364,760 A | 12/1982 | Higuchi et al. ............... 55/523 |
| 4,364,761 A | 12/1982 | Berg et al. .................... 55/523 |
| 4,417,908 A | 11/1983 | Pitcher, Jr. .................... 55/523 |
| 4,781,831 A | 11/1988 | Goldsmith ................... 210/247 |
| 4,894,160 A | 1/1990 | Abe et al. ................. 210/510.1 |
| 5,009,781 A | 4/1991 | Goldsmith ................... 210/247 |
| 5,108,601 A | 4/1992 | Goldsmith ................... 210/247 |
| 5,114,581 A | 5/1992 | Goldsmith et al. .......... 210/650 |
| 5,195,319 A | 3/1993 | Stobbe .......................... 60/303 |
| 5,223,318 A | 6/1993 | Faber et al. .................. 428/116 |
| 5,326,519 A | 7/1994 | Claussen ...................... 264/641 |
| 5,415,775 A | 5/1995 | Castillon et al. ............. 210/490 |
| 5,497,620 A | 3/1996 | Stobbe .......................... 60/303 |
| 5,607,586 A | 3/1997 | Grangeon et al. ....... 210/321.78 |
| 5,607,630 A | 3/1997 | Claussen ...................... 264/60 |
| 5,641,332 A | 6/1997 | Faber et al. ................... 55/523 |
| 5,824,220 A | 10/1998 | Grangeon et al. ....... 210/321.78 |
| 5,843,859 A | 12/1998 | Claussen ..................... 501/128 |
| 5,855,781 A | 1/1999 | Yorita et al. ............ 210/321.82 |
| 6,025,065 A | 2/2000 | Claussen et al. ........... 428/307.7 |
| 6,051,277 A | 4/2000 | Claussen et al. .......... 427/376.3 |
| 6,077,436 A | 6/2000 | Rajnik et al. ................ 210/650 |
| 6,126,833 A | 10/2000 | Stobbe et al. ................ 210/650 |

FOREIGN PATENT DOCUMENTS

| | | |
|---|---|---|
| EP | 0 766 995 | 4/1997 |
| FR | 2061933 | 6/1971 |

OTHER PUBLICATIONS

Luyten et al., Shaping of a RBAO membrane support; Key.Eng. Mat., 132–136, 1691–1694 (1997).

Vercammen, et al., "Porous Reaction Bonded Alumina: Matching and Joining Properties", Key Eng. Mat., 132–136, 1703–1706 (1997).

Luyten et al., "Shaping of Multilayer Ceramic Membranes by Dip Coating", J.Eur. Cer.Coc., 17, 273–279 (1997).

Vercauteren et al., "Porous Ceramic Membranes: Preparation, Transport Properties and Applications", J. of Porous Materials, 5 (1998) 241–245.

Ding, et al., "Extruded Porous Reaction Bonded Alumina Support with Boehmite as Aid", paper P123, poster paper at the 6th International Conference on Inorganic Membranes, Montpellier, France, Jun. 26–30, 2000.

Falamaki, et al., "RBAO Membranes/Catalyst Supports with Enhanced Permeability", J. Eur. Cer. Soc., 21, 2267–2274 (2001).

Suxing Wu, et al.;, "Mechanisms and Kinetics of Reaction–Bonded Aluminum Oxide Ceramics"; J. Am. Ceram.Soc. 76, (4), 970–80 (1993).

Greg A. Ward etal.; "Synthesis of Barium Hexaferrite by the Oxidation of a Metallic Barium–Iron Precursor"; J.Am.Ceram.Soc. 80, (6), 1508–16 (1997).

Suxing Wu, "Reaction Bonding and Mechanical Properties of Mullite/Silicon Carbide Composites"; J.Am.Ceram.Soc. 77 (11), 2898–904 (1994).

Primary Examiner—Ngoclan Mai
(74) Attorney, Agent, or Firm—Nields & Lemack

(57) ABSTRACT

A reaction-bonded α-alumina filter element is provided. The filter element includes a monolith of porous material having multiple passageways extending from one end face to an opposing end face. The monolith is extruded from a mixture containing at least aluminum metal and alumina powders in a proportion such that on sintering the volume change of the monolith is minimized. The filter body can be used as a filter or as a membrane support for crossflow or dead end flow filter elements. A method for making the filter element is also provided.

17 Claims, 3 Drawing Sheets

REACTION BONDED ALUMINA FILTER AND MEMBRANE SUPPORT

FIELD OF THE INVENTION

This invention relates to an improved porous alumina filter body formed from an extruded monolith substrate. The body is formed by sintering mixtures containing aluminum and alumina powders in an oxidizing atmosphere (e.g., air). During sintering of the body, oxidation of the metal occurs with a concomitant expansion that counteracts the shrinkage caused by sintering, giving an overall volume change that is negligibly small or zero. The resulting body is highly permeable to gases and liquids, and may be used for filtration purposes or as a support for a semi-permeable membrane.

BACKGROUND OF INVENTION

Ceramic Honeycomb Monoliths. Extruded ceramic honeycomb monoliths were initially developed as catalyst supports for automotive catalytic converters, environmental catalyst supports for fixed site installations, and diesel particulate filters. These monoliths have a multiplicity of passageways that extend from one end face to an opposing end face. The cell structure is formed by the extrusion process, with a cell density as low as low as 9 cells per square inch (cpsi) to as high as 1400 cpsi. For monoliths with circular cross sections, diameters can be as large as 12 inches, or greater. The length of such monoliths in extrusion can be over 6 feet, and is limited by such factors as the available facilities for uniform drying and sintering. Numerous patents exist for such monoliths produced from cordierite (e.g., Lachman and Lewis in U.S. Pat. No. 3,885,997, and Frost and Holleran in U.S. Pat. No. 3,899,326) and silicon carbide (e.g., Stobbe in U.S. Pat. No. 5,195,319 and U.S. Pat. No. 5,497,620). In general, such monoliths, especially those with larger diameters and longer lengths, are difficult to produce from most ceramics. Cordierite has been produced relatively readily because it has a low coefficient of thermal expansion (CTE) of about $2 \times 10^{-7}/°$ C. to $1 \times 10^{-6}/°$ C. This low CTE minimizes thermal and mechanical stresses during the sintering and cool-down process, allowing sintering of such monoliths and avoiding fracture during sintering. Silicon carbide monoliths with a higher CTE of about $3.5-4 \times 10^{-6}/°$ C. have superior thermal and mechanical properties that permit their sintering and cooling without fracturing. First, the relatively high thermal conductivity of silicon carbide (e.g., >5W/m-K) relieves thermal gradients within the monolith. Second, the relatively high mechanical strength allows greater stress tolerance during sintering and cool-down. Third, and relevant to the subject of this invention, the volume change during sintering is very small, typically about 1–2% shrinkage. This "near net shape" property is important for sintering ceramic bodies in a way that minimizes internal stresses during the sintering cycle, thereby reducing the risk of mechanical failure.

In summary, present methods for manufacturing honeycomb-structured monoliths involve extrusion of suitably plastic batch materials through a die, followed by drying and sintering at an appropriate temperature to produce the final monolith. The choice of materials currently available for monolith fabrication is restricted to those that have a very low CTE or exhibit negligible (<2–5% linear) shrinkage during sintering in order to prevent deformation and/or cracking of the monolith channels during sintering and subsequent cooling. At present, honeycomb-structured monoliths are only commercially available in relatively low CTE materials, such as cordierite, mullite and silicon carbide. Although cordierite and mullite are relatively inexpensive materials, their chemical durabilities are inferior to those of silica-free oxide ceramics. The chemical durability of silicon carbide is significantly greater, but the relatively high fabrication cost associated with sintering at elevated temperatures (>2000° C.) in an inert atmosphere make the use of silicon carbide an expensive proposition for many engineering applications. Also, when used for certain applications, including those involving membrane coatings, silicon carbide monoliths may suffer from a chemical durability limitation. Specifically, the surface of silicon carbide is readily oxidized to silica. The bond between an overlying membrane coating and this silica interface may be subject to chemical attack, especially by alkaline solutions.

Porous Ceramic Monoliths as Membrane Supports. Porous ceramic monoliths are widely used as supports for filter bodies and ceramic membrane filter devices, and the patent art contains descriptions of monoliths produced from many different materials. Perhaps the earliest disclosure was in the French Patent Publication 2,061,933, filed Oct. 3, 1969 by the Commissariat a L'Energie Atomique, which describes a multichannel α-alumina monolith as a support for an α-alumina ultrafiltration membrane. In 1978 Hoover and Roberts (U.S. Pat. No. 4,069,157) described the use of cordierite honeycomb monoliths as supports for dynamically formed membranes. In 1984, Gillot, et al., presented a paper "New Ceramic Filter Media for Cross-Flow Microfiltration and Ultrafiltration" (*Filtra* 1984 *Conference, Oct.* 2–4, 1984) that described the use of sintered α-alumina membranes deposited on sintered α-alumina monoliths supports, closely related to the CEA French patent mentioned above. Abe, et al. (U.S. Pat. No. 4,894,160) disclosed the use of clay-bonded α-alumina as a honeycomb monolith support. In 1993 Faber and Hudgins described the use of titania as a monolith membrane support (U.S. Pat. No. 5,223,318). In 1995 Castillon and Laveniere (U.S. Pat. No. 5,415,775) disclosed the use of a mixture of titania/α-alumina monoliths as membrane supports. Grangeon and Lescoche describe metal oxide monolith supports containing titania in combination with other metal oxides, especially alumina (U.S. Pat. No. 5,607,586 and U.S. Pat. No. 5,824,220).

In general, porous α-alumina, configured in tubular and monolith structures, is the most common material used as a support for ceramic membranes. Such porous α-alumina materials are most commonly produced by sintering a monodisperse alumina at temperatures of 1600° C. to 1800° C. The use of clay, or other metal oxides, or fine α-alumina reactive binders can reduce the sintering temperature needed.

Large diameter honeycomb monoliths have been used for membrane supports for crossflow membrane devices. For example, the patents of Hoover and Roberts (U.S. Pat. No. 4,069,157), Hoover and Iler (U.S. Pat. No. 4,060,488), Goldsmith (U.S. Pat. No. 4,781,831, U.S. Pat. No. 5,009,781, and U.S. Pat. No. 5, 108,601), Faber and Frost (U.S. Pat. No. 5,641,332), Yorita, et al., (U.S. Pat. No. 5,855,781), and Rajnik, et al. U.S. Pat. No. 6,077,436) disclose such devices.

Similar large diameter monoliths have been used as dead end filters, especially for diesel exhaust gas filtration. Early diesel filter devices are described by Outland (U.S. Pat. No. 4,276,071), Higuchi, et al. (U.S. Pat. No. 4,293,357, U.S. Pat. No. 4,340,403 and U.S. Pat. No. 4,364,760), Berg, et al., (U.S. Pat. No. 4,364,761), Pitcher (U.S. Pat. No. 4,329,162 and U.S. Pat. No. 4,417,908), and other extensive patent art.

Similar monolith structures have been used as membrane supports for dead end membrane filters in which the monolith passageways are coated with a membrane and the passageway ends are plugged, for example, in an "alternate, adjacent checkerboard pattern" typical of diesel exhaust filters, Goldsmith, et al. (U.S. Pat. No. 5,114,581). These filters can be used for the removal of particulates from a gas or a liquid.

The above large diameter monoliths used as membrane supports (or filter bodies) have all been conceptual designs or made from ceramic materials (cordierite, mullite or silicon carbide) that can be successfully extruded, dried and sintered in large diameter parts while maintaining mechanical integrity. The decisive disadvantage of ceramics and ceramic composites formed by such a process is the normally high linear shrinkage that occurs between the green body and the final product, typically in the range of 5% to 15%. This shrinkage is problematic when trying to maintain the shape and dimension of a part. Shrinkage during sintering and cool-down can lead to the formation of cracks and other defects, up to and including the fracture of large parts.

Reaction Bonded Alumina Materials. Claussen has disclosed reaction-bonded alumina (RBAO) materials, in which α-alumina and related ceramic bodies are sintered using precursors that show "near net shape" on sintering, i.e., negligible volume change occurs on sintering the green (unfired) body to the sintered state (Claussen, U.S. Pat. No. 5,607,630). The RBAO process includes the use of metal and ceramic powders in the batch formulations to form green bodies. During heating, the metal powder undergoes a volumetric expansion as a consequence of oxidation, and this volume increase offsets the normal shrinkage due to sintering of the ceramic powder constituents. The work of Claussen and those of several other groups active in the RBAO field focus on fabrication of near net shape bodies with low to negligible porosity. This low porosity and small pore size is achieved, in part, because the metal and ceramic powders used in the forming of the bodies are reduced to about 1 $\mu$m by aggressive attrition milling. Relatively high metal powder contents are also used, and this leads to filling of the pore volume during the oxidative expansion of the metal.

Claussen, et al., have also disclosed the fabrication of analogous near net shape ceramic bodies from other ceramic materials (Claussen, et al., in U.S. Pat. No. 5,326,519, U.S. Pat. No. 5,843,859, U.S. Pat. No. 6,025,065 and U.S. Pat. No. 6,051,277)

Variations on the chemistry of the process have also been reported, including the incorporation of $ZrO_2$ in the RBAO body (Wu, et al., *J. Am. Ceram. Soc.*, 76 (1993) 970), oxidation of a metallic Ba—Fe precursor to barium hexaferrite (Ward and Sandhage, *J. Am. Ceram. Soc.*, 80 (1997) 1508), and the oxidation of aluminum with SiC to form mullite/alumina/SiC composites (Wu and. Claussen, *J. Am. Ceram. Soc.*, 77 (1994) 2898). The results of Wu, et al., are also included, in part, in the Claussen patents cited above. In all cases, however, the intention has been to form a dense ceramic part with essentially no open porosity.

Reaction Bonded Alumina Monoliths as Membrane Supports. The reaction-bonding mechanism of Claussen has been extended to alumina ceramic membranes by Andriansens, et al. of the Belgian institute V.I.T.O (EP 0,766,995 A1), which discloses the possible use of RBAO membrane supports. The characteristics of these RBAO membrane supports are more fully disclosed in V.I.T.O published technical papers (Luyten, et al., "Shaping of a RBAO membrane support", *Key. Eng. Mat.*, 132–136, 1691–1694 (1997); Vercammen, et al., "Porous Reaction Bonded Alumina: Machining and Joining Properties", *Key Eng. Mat.*, 132–136, 1703–1706 (1997); Luyten, et al., "Shaping of Multilayer Ceramic Membranes by Dip Coating", *J. Eur. Cer. Soc.*, 17, 273–279 (1997); and, Vercauteren, et al., "Porous Ceramic Membranes: Preparation, Transport Properties and Applications", *J. of Porous Materials*, 5 (1998) 241–258). These supports are characterized in that the process of Claussen has been followed, and the RBAO membrane supports have been processed as supports for gas separation membranes. Very fine powder precursors and/or extensive milling were employed to reduce precursor powder size. As such, the pressed supports have a very fine pore size (<0.2 $\mu$m diameter) and correspondingly would have much lower permeability that the larger-pored, monolith-based membrane supports described above.

Yet another report of a RBAO support was given in a poster paper at the 6th International Conference on Inorganic Membranes, Montpellier, France, Jun. 26–30, 2000 (Ding, et al., "Extruded Porous Reaction Bonded Alumina Support with Boehmite as Aid", paper P123). The supports were extruded with either polyvinyl alcohol (PVA) or boehmite as a binder. Supports with pore diameter of 0.65–0.85 $\mu$m diameter and 41–43% porosity were obtained.

Still another research group active in development of RBAO membrane supports is at the Materials and Energy Research Center, Tehran, Iran (Falamaki, et al., "RBAO Membranes/Catalyst Supports with Enhanced Permeability", *J. Eur. Cer. Soc.*, 21, 2267–2274 (2001). This group has reported processes to make RBAO membrane supports using fine α-alumina powder (ca. 1 $\mu$m particle size) and lightly milled aluminum (ca. 1 $\mu$m particle size). The difference in the preparation method of this group is that the oxidation of the aluminum occurs as a liquid (molten) aluminum-gas reaction in lieu of the solid-gas reaction by Claussen, et al. The supports of this group also have pore diameters well below 1 $\mu$m.

In all the above RBAO work, either in the preparation of near dense parts or porous membrane supports, there is no evidence that any prior work involved the extrusion of porous honeycomb monoliths as described above. Moreover, for the limited amount of work performed for membrane supports, all structures had pore diameters below 1 $\mu$m diameter. As disclosed in the monolith art for membrane supports above, porous supports with larger pore size and greater permeability are required to be suitable. This is especially true for the supports disclosed by Goldsmith (patents cited above) for monoliths used for crossflow filters, membrane-coated filters, and dead-end particulate filters. For these, the relatively high level membrane or filter surface area per unit volume of monolith (>100 $ft^2/ft^3$) and the associated high level of filtrate or permeate flow requires a highly permeable support. The analysis supporting this conclusion is presented in U.S. Pat. No. 4,781,831. Further analysis of the permeability requirements for high surface area monoliths with large diameter are disclosed in Hoover and Roberts (cited above).

SUMMARY OF INVENTION

It is therefore an object of this invention to provide an improved porous α-alumina substrate in the form of an extruded, multiple-passageway monolith.

It is a further object to provide such a substrate that exhibits small to negligible volume change on sintering of the extruded green monolith.

It is a further object of this invention to provide such a porous α-alumina substrate in a large diameter monolith with a large amount of surface area of the monolith passageway walls relative to the volume of the monolith.

It is a further object of this invention to provide such a substrate which has a mean pore size and porosity required to effectively serve as a monolith-based porous support for a pressure driven membrane device.

This invention results from the realization that the fabrication of such an α-alumina monolith substrate requires a composition of the green monolith that undergoes minimal volume change on sintering, and that this can be accomplished by extruding a monolith which contains at least aluminum metal and relatively coarse alumina powders mixed in a proportion such that the volume change of the green monolith on sintering is controllably small. This invention also results from the realization that certain minimal pore size and porosity properties of the monolith are required for monolith-based composite filtration devices. Finally, this invention also realizes that incorporating an alumina (preferably α-alumina) of a powder size above a certain minimum is needed to realize the minimal pore size for the effective use of such monoliths.

This invention features a porous α-alumina substrate consisting of a sintered monolith of porous material defining a plurality of passageways extending longitudinally from one end face of the monolith along the length of the monolith to an opposing end face. The monolith is extruded from a mixture containing at least an aluminum metal powder and an alumina powder and dried to form a green monolith, the mixture containing the aluminum and alumina powders in a proportion controlled to minimize the volume change of the sintered monolith from that of the green monolith. The surface area of the passageways of the substrate is at least 100 $ft^2/ft^3$, and the mean pore diameter of the porous material is greater than about 1 $\mu$m.

In a preferred embodiment of the α-alumina substrate, the alumina powder in the mixture includes an α-alumina powder with a mean particle size in the range of about 5–200 $\mu$m. In another embodiment of the substrate, the alumina powder in the mixture can further include a fine reactive α-alumina powder. Preferably, the sintered α-alumina monolith shows a volume change on firing of less than about 5% from that of the green monolith. Also, an α-alumina precursor can be included in the mixture, and this precursor forms α-alumina on sintering of the green monolith. Such a precursor can be a transition alumina, aluminum hydroxide, a hydrated alumina, a soluble aluminum compound, and mixtures thereof. In addition, another metal oxide can be admixed with the mixture used to extrude the substrate. This metal oxide can be selected from the group consisting of zirconia, titania, magnesia, and mixtures thereof. The mixture can also include the addition of organic additives to facilitate extrusion and to bind the green body.

The substrate preferably has a hydraulic diameter of at least two inches. Also, the mean pore diameter of the porous material of the substrate is preferably 3 to 50 $\mu$m, and the porosity of the porous material is preferably about 20 and 60 volume %.

One embodiment of this invention is a composite filtration device in which the α-alumina substrate has a filtration membrane applied to the passageway wall surfaces of the monolith. The membrane can be selected from the group of membranes suitable for microfiltration, ultrafiltration, nanofiltration, pervaporation and gas separations. This invention features a porous α-alumina substrate consisting of a sintered monolith of porous material defining a plurality of passageways extending longitudinally from one end face of the monolith along the length of the monolith to an opposing end face. The monolith is extruded from a mixture containing at least an aluminum metal powder and an alumina powder and dried to form a green monolith, the mixture containing the aluminum and alumina powders in a proportion controlled to minimize the volume change of the sintered monolith from that of the green monolith. The surface area of the passageways of the substrate is at least 100 $ft^2/ft^3$, and the mean pore diameter of the porous material is greater than about 1 $\mu$m.

Another embodiment of this invention features a porous α-alumina substrate consisting of a sintered monolith of porous material defining a plurality of passageways extending longitudinally from one end face of the monolith along the length of the monolith to an opposing end face. The monolith is extruded from a mixture containing at least an aluminum metal powder and an alumina powder and dried to form a green monolith, the mixture containing the aluminum and alumina powders in a proportion controlled to minimize the volume change of the sintered monolith from that of the green monolith. The particle size of the alumina powder is sufficiently large so that the mean pore diameter of the porous material is greater than about 1 $\mu$m, and the surface area of the passageways of the substrate is at least 100 $ft^2/ft^3$.

A preferred embodiment of this invention features a porous α-alumina substrate in the form of a sintered monolith of porous material defining a plurality of passageways extending longitudinally from one end face of the monolith along the length of the monolith to an opposing end face. In this embodiment, the monolith is extruded from a mixture containing at least an aluminum metal powder and an α-alumina powder and dried to form a green monolith, the mixture containing the aluminum and alumina powders in a proportion controlled to minimize the volume change of the sintered monolith from that of the green monolith. The α-alumina powder has a mean particle size in the range of 5–200 $\mu$m; the mean pore diameter of the porous material is in the range of 3 to 50 $\mu$m; the porosity of the porous material is between 20% and 60% by volume; the monolith has a hydraulic diameter of at least two inches; and the surface area of the passageways is at least 100 $ft^2/ft^3$ of the monolith.

This invention also includes a method for making a sintered, porous α-alumina substrate in which a mixture is first formed containing at least a predetermined amount of an aluminum metal powder and an alumina powder. The mixture is extruded to form a monolith containing a plurality of passageways extending from one end face of the monolith along the length of the monolith to an opposing end face and dried to form a green monolith. The green monolith is sintered at a temperature sufficient to oxidize the aluminum metal powder and to bond the monolith and then cooled to ambient temperature. In this embodiment the predetermined amounts of the aluminum metal powder and the alumina powder in the mixture are chosen in a proportion to minimize the volume change of the sintered and cooled monolith from that of the green monolith.

DETAILED DESCRIPTION OF THE INVENTION

Figure 1:
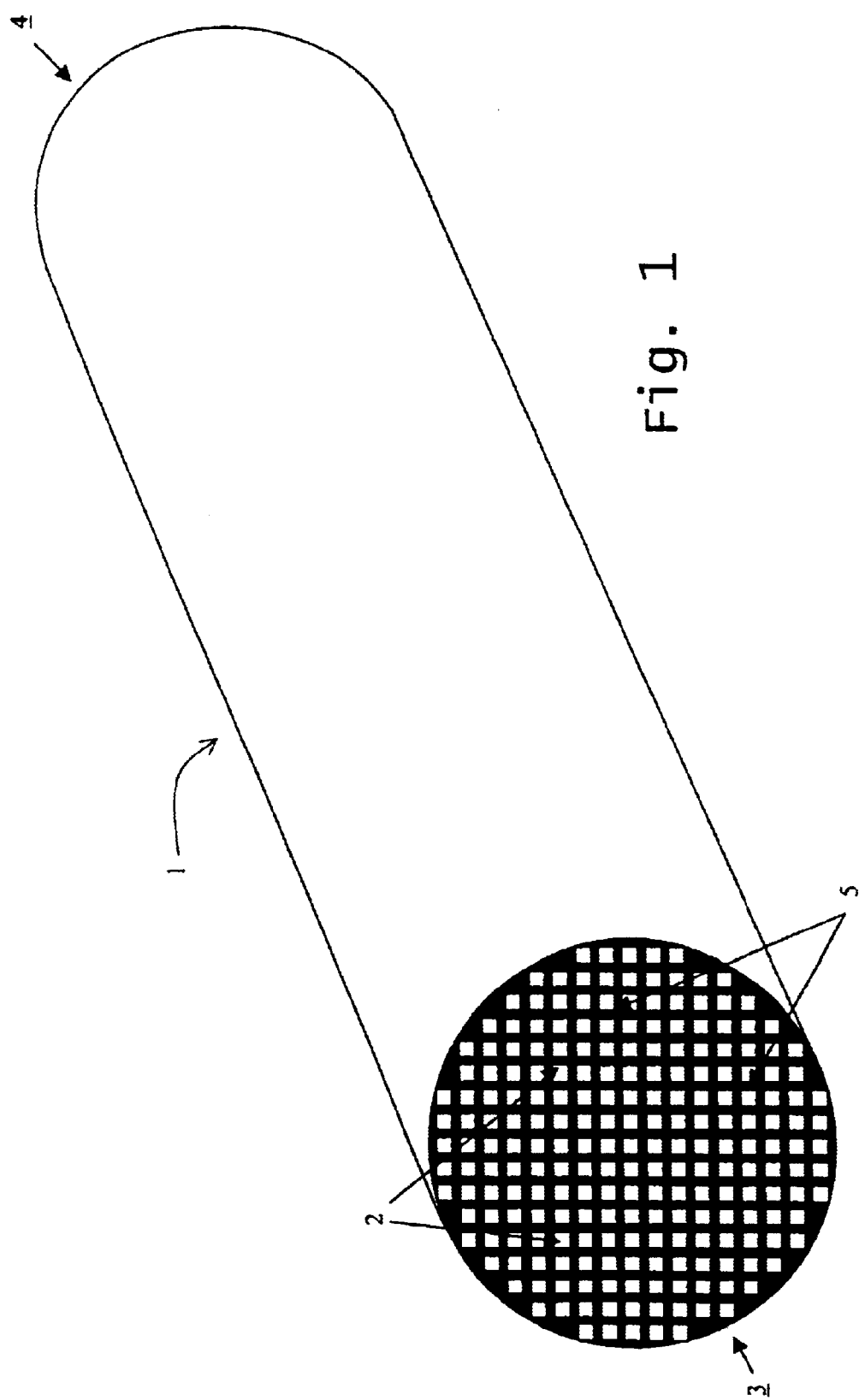
FIG. 1 is a schematic drawing of a multiple-passageway monolith substrate.

Other objects, features and advantages will occur from the following description of a preferred embodiment and the accompanying drawing, in which:

FIG. 1 is a schematic drawing of a multiple-passageway monolith substrate showing a typical structure of the type that would be covered by the claims of this patent. A porous monolith substrate 1 has a plurality of passageways 2 that extend from an end face 3 to an opposing end face 4. The walls of the monolith substrate 5 are porous and allow the transport of a fluid, gas or liquid, in a manner suitable for a crossflow filtration or membrane device or a dead end filter or membrane device. The required porosity characteristics of the monolith wall are determined by the specific structure of the filtration device and the flow/pressure drop requirements of the porous material. These requirements are disclosed in the art cited above, and can be achieved by the present invention.

Figure 2:
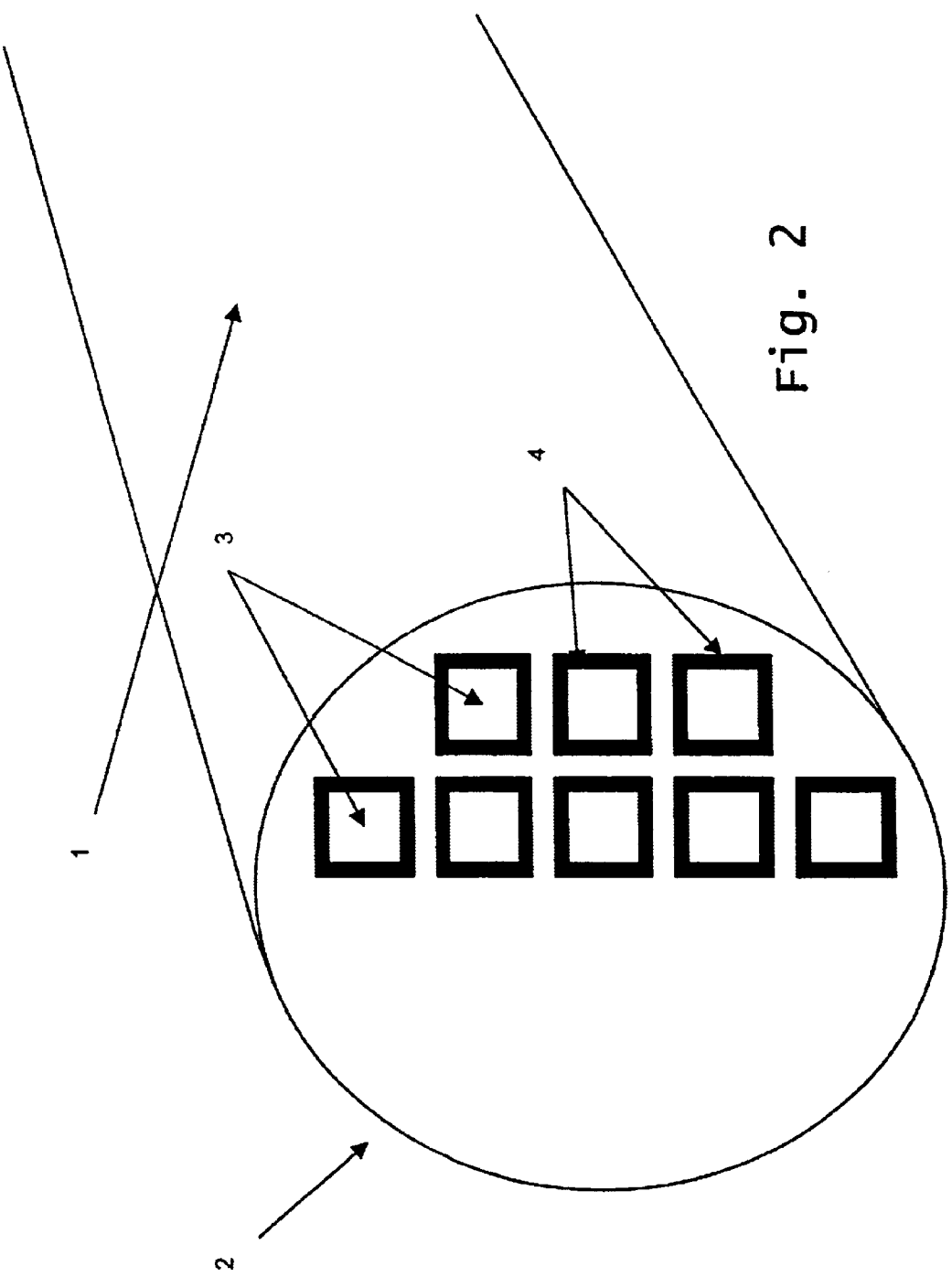
FIG. 2 is a schematic drawing of a monolith substrate showing a few passageways and illustrating the structure of a membrane coating for a composite membrane filtration device.
Figure 3:
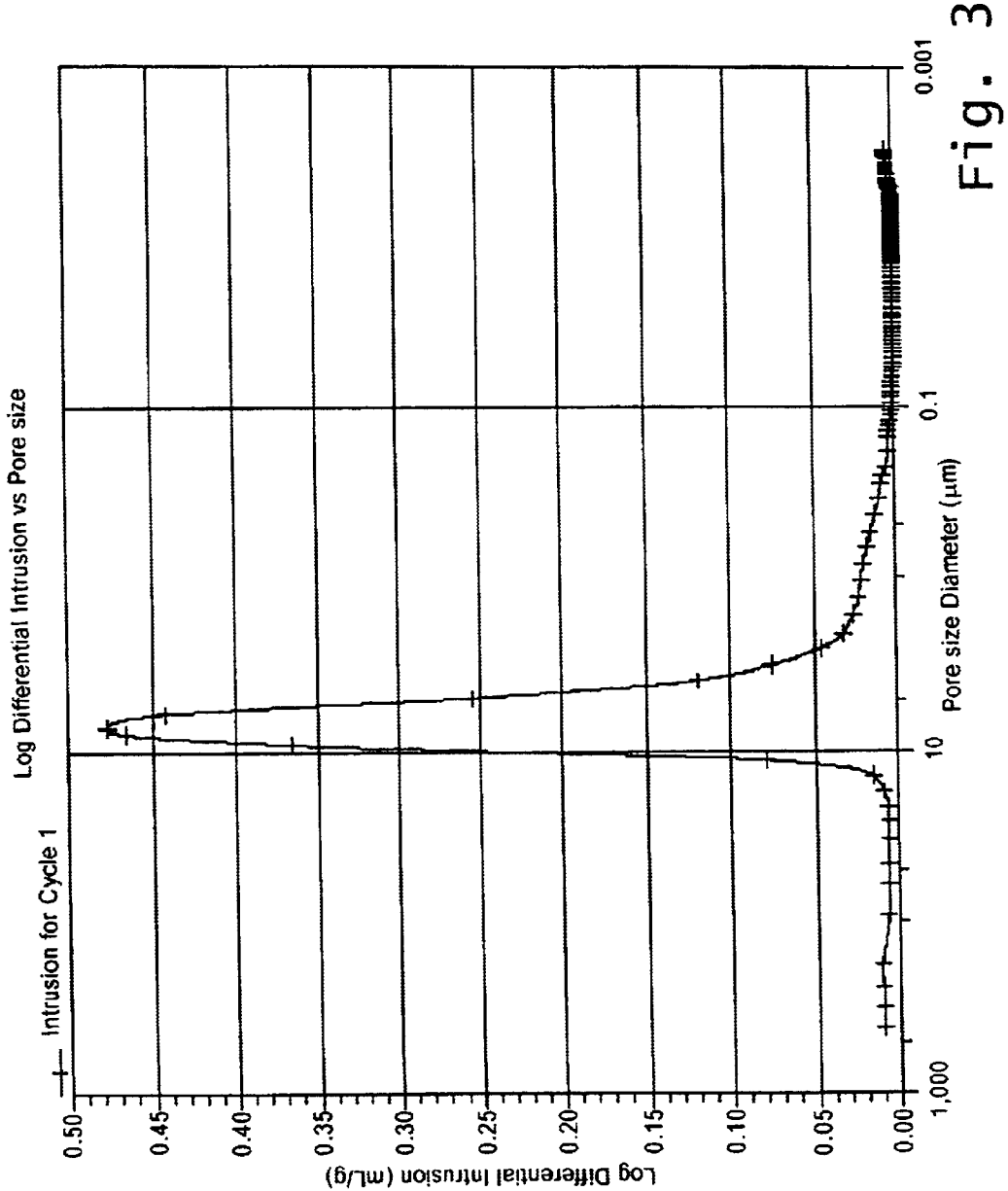
FIG. 3 is a representative pore size distribution of the porous monolith substrate material.

FIG. 2 shows a view of a few passageways of a monolith substrate 1 at one end face 2. The passageways 3 extend from the end face shown to the opposing end face, not shown. A membrane coating 4 can be applied to the wall surfaces of the passageways, and this coating typically extends along the full length of the passageways from one end face to the other.

The monolith substrate of FIG. 1 is shown as a circular cylinder. However, the configuration of the structure is not particularly limited; for example, the structure can have a cross section that is round, square or of irregular shape. These latter can be, for example, segments shaped to form a circular cylindrical structure, as disclosed in Stobbe, et al. (U.S. Pat. No. 6,126,833), incorporated herein by reference. A characteristic cross sectional dimension of any such monolith substrate would be its hydraulic diameter, defined as four times the cross sectional area divided by the wetted perimeter.

The present invention relates to the production of highly porous, extruded, reaction-bonded α-alumina monoliths that can be formed with small to negligible volume change during sintering. Such materials when fabricated into monolith structures exhibit high surface-area to volume ratios, which structures can then be modified for use, for example, for composite membrane filters such membrane-coated crossflow filters and membrane-coated dead end filters, devices as described in the patents and technical papers cited above. These α-alumina monoliths will exhibit excellent chemical durability when incorporated into the above devices.

The basis for the invention involves fabrication of a precursor ("green") ceramic monolith substrate by extruding a mixture containing both relatively coarse alumina powder and powdered aluminum metal. As a further option, low volume fractions of fine alumina powder, finely-powdered alumina-precursor materials, and appropriate organic binders and plasticizers may be included in the batch formulation to assist fabrication and/or to give improvements in the final ceramic properties. As with the RBAO process for forming dense α-alumina bodies, the shrinkage that accompanies sintering to form the final ceramic device is counteracted by expansion that occurs from oxidation of the aluminum metal powder. In the current invention, however, the overall porosity is largely defined by packing of the coarse alumina particles, which preferably undergo negligible volume change at the sintering temperature of the monolith substrate. If these coarse alumina particles are α-alumina, the volume change can be small. The strength of the sintered body is derived from the creation of "necks" among the coarse and fine particles during metal oxidation and sintering. Neck formation produces a minimal reduction in the pore density during sintering, so that, in contrast to the RBAO process, a relatively small amount of aluminum metal powder can be all that is required to compensate for volume change.

The coarse alumina powder preferably is α-alumina, which will shrink only moderately during the sintering process. This alumina powder preferably has a narrow particle size distribution so that the porosity of the final monolith is maximized. Typical particle size of a preferred alumina powder is in the range of 5 to 200 $\mu$m. The size of such alumina powders is frequently defined in terms of a FEPA (Federation of European Producers of Abrasives) grit, and the above size range would correspond to FEPA grits between F 1000 (4.5 $\mu$m) and F 70 (218 $\mu$m).

Normally, sintered α-alumina bodies (sintered at 1600–1800 C) will shrink typically by 8 vol. % or more. The expansion of the aluminum metal during oxidation offsets this shrinkage, and importantly allows bonding at a temperature below the temperature at which a purely α-alumina body would be sintered. In addition, it is possible to increase the aluminum metal content in the green body to a point that would, in theory, give an overall volumetric expansion during oxidation, and to compensate for this expansion by including in the body an alumina-precursor material that undergoes shrinkage when it converts to α-alumina during firing. In this way, the near net shape of the fired monolith substrate is maintained. Alumina-precursor materials that can be employed for this purpose include transition aluminas (such as pseudoboehmites, gamma, delta and theta aluminas), aluminum hydroxide, hydrated aluminas, soluble aluminum compounds such as salts and organic compounds, and mixtures thereof. Further, the coarse alumina could be an alumina or alumina precursor powder that converts to α-alumina at the sintering temperature. Also, other ceramic oxide powders can be admixed with the alumina powder to impart desired structural or chemical properties, including zirconia, titania, magnesia and mixtures thereof.

A variety of organic additives can be employed to facilitate extrusion, such as a lubricating agent, for example, stearic acid. Organic binders are also employed to impart strength to the extrudates and to facilitate handling of the green body. Such materials could include, typically, methylcellulose or carboxymethylcellulose. The use of lubricants to facilitate extrusion and organic binders to maintain structure of the green body are well known in the art and widely applied in the commercial production of such monoliths.

The heating rate to the sintering temperature is to be carefully controlled, as in the RBAO process, for the following reasons: (1) to avoid formation of structural defects due to rapid oxidation of the aluminum metal; and (2) to minimize melting of the aluminum metal before sufficient aluminum oxidation has occurred to create inter-particle bonds and hold the monolith substrate together during further heating. This bonding is then supplemented by high-temperature sintering to convert all alumina materials present to α-alumina.

Sample Mixtures 1–7: Pressed Disks

These mixtures were based on varying proportions of the following powders:

Coarse Code 3000 240 grit alumina powder, 99.5% purity (Norton Division of Saint-Gobain Ceramic Materials);

Fine ($d_{50}$=0.4 $\mu$m, surface area 9.5 m$^2$/g) alumina powder (Alcoa A-16SG);

Fine ($d_{50}$=0.4 $\mu$m, surface area 8.0 m$^2$/g) alumina powder (Ceralox APA 0.5);

Aluminum metal, 1–3 $\mu$m diameter, spherical powder (AL-104, AEE division of Micron Metals Inc.).

In all cases except Example 7, the Alcoa A-16SG or Ceralox APA 0.5 powders were added as a 60 wt. % dispersion in dilute nitric acid (pH~3).

Sample Mixture 1

35 g Norton 240-grit alumina+16.7 ml Ceralox APA 0.5 suspension+2.65 g AL-104 powder were mixed, dried and crushed. A solution of 0.5 g stearic acid in 20-ml warm ethanol was blended in and dried. Approximately 3.5 g of 10% polyvinyl pyrrolidine (PVP) in ethanol was blended in as a binder to give a damp mixture suitable for pellet pressing.

Sample Mixture 2

35 g Norton 240-grit alumina+16.7 ml Alcoa A-16SG suspension were blended to give a fairly fluid mix. A further suspension of 2.65 g AL-104 powder in a solution of 0.5 g stearic acid in 20-ml warm ethanol was added, thoroughly mixed, dried and crushed. Approximately 2 g of 10% PVP in ethanol was blended in as a binder to give a damp mixture suitable for pellet pressing.

Sample Mixture 3

35 g Norton 240-grit alumina+12.5 ml Ceralox APA 0.5 suspension were mixed to give a fairly soft paste, then dried and crushed. A further suspension of 3.97-g AL-104 powder in a solution of 0.5 g stearic acid in 20-ml warm ethanol was added, thoroughly mixed, dried and crushed. Approximately 4 g of 10% PVP in ethanol was blended in as a binder to give a damp mixture suitable for pellet pressing.

Sample Mixture 4

35 g Norton 240-grit alumina+12.5 ml Alcoa A-16SG suspension were mixed to give a soft paste, then dried and crushed. A further suspension of 3.97-g AL-104 powder in a solution of 0.5 g stearic acid in 20-ml warm ethanol was added, thoroughly mixed, dried and crushed. Approximately 2 g of 10% PVP in ethanol was blended in as a binder to give a damp mixture suitable for pellet pressing.

Sample Mixture 5

35 g Norton 240-grit alumina+8.3 ml Ceralox APA 0.5 suspension+5.29 g AL-104 powder were mixed, dried and crushed. A solution of 0.5 g stearic acid in 20-ml warm ethanol was added, thoroughly mixed, dried and crushed. Approximately 2.5 g of 10% PVP in ethanol was blended in as a binder to give a damp mixture suitable for pellet pressing.

Sample Mixture 6

35 g Norton 240-grit alumina+8.33 ml Alcoa A-16SG suspension were mixed to give a soft paste, then dried and crushed. A further suspension of 5.292-g AL-104 powder in a solution of 0.5 g stearic acid in 20-ml warm ethanol was added, thoroughly mixed, dried and crushed. Approximately 1.8 g of 10% PVP in ethanol was blended in as a binder to give a damp mixture suitable for pellet pressing.

Sample Mixture 7

For comparative purposes, a control material comprised of 100% coarse (240 grit) alumina (i.e., containing no fine alumina powder or additions of Al metal) was made. The coarse alumina powder was mixed with 1 wt % stearic acid and 6 wt % of a 10% solution of PVP in ethanol to give a damp mixture suitable for pellet pressing.

EXAMPLE 1

Five 4-g pellets of each mixture from Sample Mixtures 1–6 and of the control Sample Mixture 7 were pressed in a 1-inch diameter die set at ~14,250 psig. All pellets were sintered in an electric furnace (air atmosphere) according to the following schedule: 2° C./min to 800° C., 4° C./min to 1600° C., held for 2 hours at 1600° C., cooled at 10° C./min.

The sintered compositions were as given in Table 1.

TABLE 1

Compositions of Examples 1–6 Sintered Materials

| Material | Wt. % 240 grit alumina | Wt. % fine alumina ($d_{50}$ = 0.4 μm) | Wt. % alumina from Al metal oxidation |
|---|---|---|---|
| Example 1 | 70 | 20 Ceralox APA 0.5 | 10 |
| Example 2 | 70 | 20 AlcoaA-16SG | 10 |
| Example 3 | 70 | 15 Ceralox APA 0.5 | 15 |
| Example 4 | 70 | 15 Alcoa A-16SG | 15 |
| Example 5 | 70 | 10 Ceralox APA 0.5 | 20 |
| Example 6 | 70 | 10 Alcoa A-16SG | 20 |

The sintered pellets were used for measurements of sintering shrinkage, open porosity, biaxial flexural strength and nitrogen permeability. Mean values of these properties are summarized in Table 2. The examples illustrate the effects of varying the fine-alumina/aluminum-powder ratio while keeping the coarse alumina fraction constant. As would be expected, the sintering shrinkage decreases and becomes negative with increasing additions of aluminum powder.

TABLE 2

Mean Physical Properties (± σ) of Examples 1–6 Sintered Materials

| Material | Sintering shrinkage (%) | Open Porosity (%) | Biaxial Flexural Strength (psi) | $N_2$ Permeability ($10^3$ m$^2$/bar/s) |
|---|---|---|---|---|
| Example 1 | 0.9 ± 0.1 | 26.2 ± 1.3 | 3945 ± 566 | 12.0 ± 0.5 |
| Example 2 | 0.1 ± 0.1 | 20.5 ± 1.5 | 6106 ± 435 | 7.8 ± 1.6 |
| Example 3 | -1.2 ± 0.1 | 22.8 ± 1.9 | 5482 ± 1015 | 8.7 ± 1.6 |
| Example 4 | -1.2 ± 0.2 | 21.4 ± 1.0 | 5845 ± 928 | 7.9 ± 1.4 |
| Example 5 | -2.7 ± 0.1 | 31.8 ± 0.1 | 2938 ± 67 | 22.4 ± 3.8 |
| Example 6 | -2.7 ± 0.2 | 24.5 ± 0.1 | 5685 ± 508 | 15.9 ± 2.4 |
| Control material | 0.0 ± 0.0 | 36.2 ± 0.4 | * | ** |

*below measurement range of test equipment;
**not measured;
σ = standard deviation

EXAMPLE 2

In order to form a composition suitable for extrusion, i.e., with the necessary organic components, the following mixture was prepared: 57.0 g 240 grit alumina (Code 3000 alumina from Saint-Gobain Ceramic Materials)+16.3 g Alcoa A-16SG+4.3 g AL-104 from Atlantic Equipment Engineers were dry-milled under nitrogen for 1 hour, using alumina grinding media, to break up powder agglomerates. After sieving to remove the grinding media, the milled powder was dry blended with 4.2 g MH300 methyl cellulose (Tylose MH 300 P2 from Clariant Corporation). A solution of 1.1-g stearic acid in 4.0 g warm ethanol was added and blended in. A further addition of 0.4-g ethylene glycol was blended in. Finally, 1.1-g of a 7% solution of Elvanol grade 85-82 polyvinyl alcohol (DuPont) and 7.7 g water were added and blended in. Thus, the overall composition of Example 8 was (wt. %): 59.3% coarse 240 grit $Al_2O_3$ powder; 17.0% fine Alcoa A-16SG $Al_2O_3$ powder; 4.5% Al metal (AL-104); 4.4% methyl cellulose; 1.1% stearic acid; 4.2% ethanol; 0.4% ethylene glycol; 0.08% PVA; 9.1% water.

The homogenized mixture was extruded into a 1-inch diameter billet. Approximately 0.12-inch length slice samples were taken from the billet and sintered in air according to the following schedule: 2° C./min to 800° C., 4° C./min to 1600° C., held for 2 hours at 1600° C., cooled to room temperature at 10° C./min. The mean sample properties are included in Table 3.

TABLE 3

Mean Physical Properties (± σ) of Reaction-Bonded Alumina Materials Sintered at 1600° C. for 2 Hours

| Material | Sintering shrinkage (%) | Open Porosity* (%) | Biaxial Flexural Strength (psi) | N$_2$ Permeability (10$^3$ m$^2$/bar/s) |
|---|---|---|---|---|
| Example 8 | 1.1 ± 0.1 | 32.6 ± 0.8 | 2950 ± 80 | 36.8 ± 2.4 |
| Control material (100% coarse Al$_2$O$_3$) | 0.0 ± 0.0 | 36.2 ± 0.4 | ** | *** |

*determined by water absorption;
**below measurement range of test equipment;
***not measured;
σ = standard deviation

EXAMPLE 3

Extrusion of Monolith Substrate Bodies:

Preparation of Inorganic Components: Coarse Al$_2$O$_3$ (4029.0 g of 240 Grit Code 3000 alumina from Saint Gobain Ceramic Materials) was combined with fine Al$_2$O$_3$ (1155.0 g of A-16 SG from Alcoa) and aluminum metal (306.0 g of Al-104 from Atlantic Equipment Engineers). This dry mixture was purged with nitrogen (Industrial Grade) in a milling jar for 45 minutes and then mixed in a ball mill with 9.4 mm spherical alumina spheres grinding media for 20 minutes. Methyl cellulose (312.0 g of "TYLOSE" MH 300 P2 from Clariant Corporation) was added to the milled mixture and this dry mixture was stirred for 20 minutes in a 30-quart Hobart planetary mixer.

Preparation of Stearic Acid-Ethanol mixture: Ethanol (300.0 g of HPLC Grade from Fisher Scientific) was heated to 60° C. on a hot plate and stearic acid (100.0 g of Laboratory Grade from Fisher Scientific) was dissolved in the warm ethanol.

Preparation of Liquid Components: Ethylene glycol (50.0 g of Laboratory Grade from Fisher Scientific) and polyvinyl alcohol (52.5 g of 10% by weight aqueous solution, made with ultrafiltered water and DuPont GR.50-42 Polyvinyl Alcohol) was mixed into 664.2 g of UF water and stirred vigorously for 20 minutes on a magnetic stir plate.

Combination of Liquid Components: The stearic acid/ethanol solution (at 60° C.) was added to the water/ethylene glycol/polyvinyl alcohol solution with vigorous stirring. The liquid components were added very slowly to the dry components while mixing in the Hobart mixer. The entire batch was mixed until it took on a clay-like consistency (~15 minutes).

Extrusion: The batch as prepared above was fed into a single auger extruder (custom designed by LiqTech Aps, Denmark) to produce 250 mm long by 40 mm wide billets. These billets were sealed in a polyethylene bag overnight to cure. The billets were extruded into 2.625-diameter monolith substrate sections, with cells of dimension 0.16 inch and wall thickness of 0.07 inch, and dried slowly for at least 24 hours. The extruded components were periodically weighed over the next 6 days. They were considered dry when the mass remained constant.

Firing: The dried extrudates, typically 2 to 6 inches long, were fired in air in a Carbolite Box Furnace using the following preferred profile: +2° C./minute to 800° C., +4° C./minute to 1600° C., hold at 1600° C. for 18 hours, −5° C./minute to ambient. Alternative firing conditions, changing temperature and hold time at peak temperature, were evaluated. Data for sintered parts are given in Table 4. In general, parts become somewhat harder and stronger with increased sintering temperature and hold time, as the reactive forms of alumina sintered more and provided stronger bonding. Parts fired at preferred conditions (1500° C. or 1600° C. with longer hold times) were strongly bonded. A measure of pore size for one sample by mercury porosimetry showed a median pore diameter (volume) of 6.5 μm, with a sharp pore size distribution, as shown in FIG. 2. The porosity determined by mercury porosimetry was 44.4%, higher than the values in Table 4, which were determined by water absorption.

TABLE 4

Properties of Fired Monolith Specimens

| Firing Temperature, C | Firing Time, hrs | Length Change, % | Diameter Change, % | Porosity, %* |
|---|---|---|---|---|
| 1500 | 6 | 0.1 | 1.2 | 34.6 |
| 1500 | 6 | 0 | 1.15 | 34.9 |
| 1500 | 36 | — | — | 35.6 |
| 1600 | 6 | −0.3 | 0.55 | 34.6 |
| 1600 | 6 | −0.7 | 0.55 | 34.9 |
| 1600 | 18 | −0.3 | 0.45 | 35.9 |

*determined by water absorption

Although specific features of the invention are described in various embodiments, this is for convenience only as each feature may be combined with any or all of the other features in accordance with the invention. Other embodiments will occur to those skilled in the art and are within the scope of the following claims:

What is claimed is:

1. A porous α-alumina substrate, comprising:
   a sintered monolith of porous material defining a plurality of passageways extending longitudinally from one end face of the monolith along the length of the monolith to an opposing end face;
   the monolith extruded from a mixture containing at least an aluminum metal powder and an alumina powder and dried to form a green monolith, the mixture containing the aluminum and alumina powders in a proportion controlled to minimize the volume change of the sintered monolith from that of the green monolith;
   the surface area of said passageways being at least 100 ft$^2$/ft$^3$ of the monolith; and
   the mean pore diameter of said porous material being greater than about 1 μm.

2. The α-alumina substrate of claim 1, wherein said alumina powder in the mixture includes an α-alumina powder with a mean particle size in the range of about 5–200 μm.

3. The α-alumina substrate of claim 2 in which the alumina powder further includes a fine reactive α-alumina powder.

4. The α-alumina substrate of claim 1 in which said volume change is less than about 5%.

5. The α-alumina substrate of claim 1 in which an α-alumina precursor is included in the mixture, and which precursor forms α-alumina on sintering of the green monolith.

6. The α-alumina substrate of claim 5 in which the alumina precursor is selected from the group consisting of a transition alumina, aluminum hydroxide, a hydrated alumina, a soluble aluminum compound, and mixtures thereof.

7. The α-alumina substrate of claim 1 in which another metal oxide is admixed with the mixture.

8. The α-alumina substrate of claim 7 in which the metal oxide is selected from the group consisting of zirconia, titania, magnesia, and mixtures thereof.

9. The α-alumina substrate of claim 1, wherein said mixture further comprises organic additives.

10. The α-alumina substrate of claim 1 in which the monolith has a hydraulic diameter of at least two inches.

11. The α-alumina substrate of claim 1 in which the mean pore diameter of the porous material is in the range of 3 to 50 μm.

12. The α-alumina substrate of claim 1 in which the porosity of said porous material is between about 20 and 60 volume %.

13. A composite filtration device, comprising the α-alumina substrate of claim 1, wherein said passageways have wall surfaces and a filtration membrane is applied to said wall surfaces.

14. The filtration device of claim 13 in which the membrane is selected from the group of membranes suitable for microfiltration, ultrafiltration, nanofiltration, pervaporation and gas separations.

15. A porous α-alumina substrate, comprising:

a sintered monolith of porous material defining a plurality of passageways extending longitudinally from one end face of the monolith along the length of the monolith to an opposing end face;

the monolith extruded from a mixture containing at least an aluminum metal powder and an alumina powder and dried to form a green monolith, the mixture containing the aluminum and alumina powders in a proportion controlled to minimize the volume change of the sintered monolith from that of the green monolith;

the surface area of said passageways is at least 100 ft$^2$/ft$^3$ of the monolith; and the particle size of said alumina powder is sufficiently large so that the mean pore diameter of said porous material is greater than about 1 μm.

16. A porous α-alumina substrate, comprising:

a sintered monolith of porous material defining a plurality of passageways extending longitudinally from one end face of the monolith along the length of the monolith to an opposing end face;

the monolith extruded from a mixture comprising at least an aluminum metal powder and an α-alumina powder and dried to form a green monolith, the mixture containing the aluminum and alumina powders in a proportion controlled to minimize the volume change of the sintered monolith from that of the green monolith;

the α-alumina powder having a mean particle size in the range of 5–200 μm;

the mean pore diameter of the porous material being in the range of 3 to 50 μm;

the porosity of the porous material being between 20% and 60% by volume;

the monolith having a hydraulic diameter of at least two inches; and the surface area of said passageways being at least 100 ft$^2$/ft$^3$ of the monolith.

17. A method for making a sintered, porous α-alumina substrate, comprising:

forming a mixture containing at least a predetermined amount of an aluminum metal powder and an alumina powder;

extruding from the mixture a monolith containing a plurality of passageways extending from one end face of the monolith along the length of the monolith to an opposing end face;

drying said extruded monolith to form a green monolith;

sintering said green monolith at a temperature sufficient to oxidize the aluminum metal powder and to bond the monolith; and cooling the monolith to ambient temperature;

wherein said predetermined amounts of the aluminum metal powder and the alumina powder in said mixture are chosen in a proportion to minimize the volume change of the sintered monolith from that of the green monolith.

\* \* \* \* \*